United States Patent
Arakawa et al.

[11] Patent Number: 6,023,652
[45] Date of Patent: Feb. 8, 2000

[54] VEHICULAR NAVIGATION APPARATUS

[75] Inventors: Takeharu Arakawa; Morio Araki; Kiyoshi Yamanaka, all of Saitama, Japan

[73] Assignee: Pioneer Electronic Corporation, Tokyo, Japan

[21] Appl. No.: 08/243,087

[22] Filed: May 16, 1994

Related U.S. Application Data

[63] Continuation of application No. 07/868,697, Apr. 15, 1992, abandoned.

[30] Foreign Application Priority Data

Apr. 23, 1991 [JP] Japan ................................. 3-092355

[51] Int. Cl.$^7$ .................................................. G06F 17/00
[52] U.S. Cl. .......................... 701/201; 701/213; 340/995
[58] Field of Search ...................... 364/443, 444, 364/446, 449; 340/988, 990, 992, 994, 995, 996; 701/201, 213

[56] References Cited

U.S. PATENT DOCUMENTS

| | | | |
|---|---|---|---|
| 4,390,948 | 6/1983 | Mori et al. | 364/424 |
| 4,651,282 | 3/1987 | Robinson et al. | 364/443 |
| 4,937,752 | 6/1990 | Nanba et al. | 364/449 |
| 5,084,822 | 1/1992 | Hayami | 364/449 |
| 5,113,185 | 5/1992 | Ichikawa | 340/995 |
| 5,121,326 | 6/1992 | Moroto et al. | 364/449 |
| 5,297,049 | 3/1994 | Gurmu et al. | 364/436 |

FOREIGN PATENT DOCUMENTS 0346491  12/1989  European Pat. Off. .

OTHER PUBLICATIONS

Patent Abstracts of Japan vol. 7, No. 125 (P–200) May 31, 1983, Abstract of JPA 58–042914.
Patent Abstracts of Japan vol. 9, No. 105 (P–354) May 9, 1985, Abstract of JPA 59–228114.
Patent Abstracts of Japan vol. 14, No. 325 (P–1075) Jul. 12, 1990, Abstract of JPA 21–07917.
Patent Abstracts of Japan vol. 14, No. 185 (P–1036) Apr. 13, 1990, Abstract of JPA 20–32213.

*Primary Examiner*—William A. Cuchlinski, Jr.
*Attorney, Agent, or Firm*—Sughrue, Mion, Zinn, Macpeak & Seas, PLLC

[57] ABSTRACT

An actual running distance ab from a starting position to a present position of a vehicle is calculated based on input starting position data and positions continuously detected using a GPS device etc. An estimated running distance bc from the present position to a destination is calculated based on a detected present position and input destination data. A degree of attainment T representing a degree of approach to the destination is calculated according to an equation of: T=ab/(ab+bc), and is indicated on a display to announce it to a driver.

7 Claims, 5 Drawing Sheets

# VEHICULAR NAVIGATION APPARATUS

This is a Continuation of application Ser. No. 07/868,697 filed Apr. 15, 1992 now abandoned.

BACKGROUND OF THE INVENTION

The present invention generally relates to a vehicular navigation apparatus. Specifically, the invention relates to a vehicular navigation apparatus which displays on an image display unit (hereinafter referred to as "display") an own movement status together with a map such that the former is superimposed on the latter.

In recent years, vehicular navigation apparatuses have been developed in which, in order to lead a vehicle to a predetermined destination, map information is stored in advance in a memory and read out to be displayed together with a present position of the vehicle.

In such navigation apparatuses, while a vehicle moves from a starting position to a destination, a straight-line distance between a present position and the destination or an actual running distance from the starting point to the present position appears on a display simply in the form of its value to indicate a "degree of attainment", i.e., information representing a degree of approach from the starting position toward the destination. In other words, the degree of attainment relatively represents what distance has been covered until the present position, or what distance remains to reach the destination.

However, if the above-mentioned straight-line distance or actual running distance is employed to indicate the degree of attainment, a user hardly recognizes it as properly representing a value according to his actual running feeling. In particular, it is very difficult for a driver to properly recognize the degree of attainment in a changing drive situation.

SUMMARY OF THE INVENTION

The present invention has been made in view of the above problems in the art. Therefore, an object of the invention is to provide a vehicular navigation apparatus which calculates a degree of attainment in running distance that is consistent with a value according to a user's actual running feeling, and which announces to the user the calculated degree of attainment properly in a brief manner.

According to a first aspect of the invention, a vehicular navigation apparatus comprises:

means for continuously detecting a position of a vehicle while the vehicle moves from a starting position to a destination;

means for receiving data indicating the starting position and data indicating the destination;

means for calculating an actual running distance ab from the starting position to a present position based on the received starting position data and the detected positions;

means for calculating an estimated running distance bc from the present position to the destination based on a detected present position and the received destination data;

means for calculating a degree of attainment T according to an equation of: T=ab/(ab+bc); and means for announcing the calculated degree of attainment.

According to a second aspect of the invention, a vehicular navigation apparatus comprises:

means for continuously detecting a position of a vehicle while the vehicle moves from a starting position to a destination;

means for receiving data indicating the starting position and data indicating the destination;

means for continuously detecting an actual running time J(ab) from the starting position to a present position;

means for calculating an estimated running distance bc from the present position to the destination based on a detected present position and the received destination data;

means for obtaining data indicating an estimated average speed vbc from the present position to the destination;

means for calculating an estimated running time J(bc) from the present position to the destination according to an equation of: J(bc)=bc/Vbc;

means for calculating a degree of attainment T according to an equation of: T=J(ab)/{J(ab)+J(bc)}; and means for announcing the calculated degree of attainment.

DESCRIPTION OF THE PREFERRED EMBODIMENTS

Embodiments of the present invention are described hereinafter with reference to the accompanying drawings.

Figure 1:
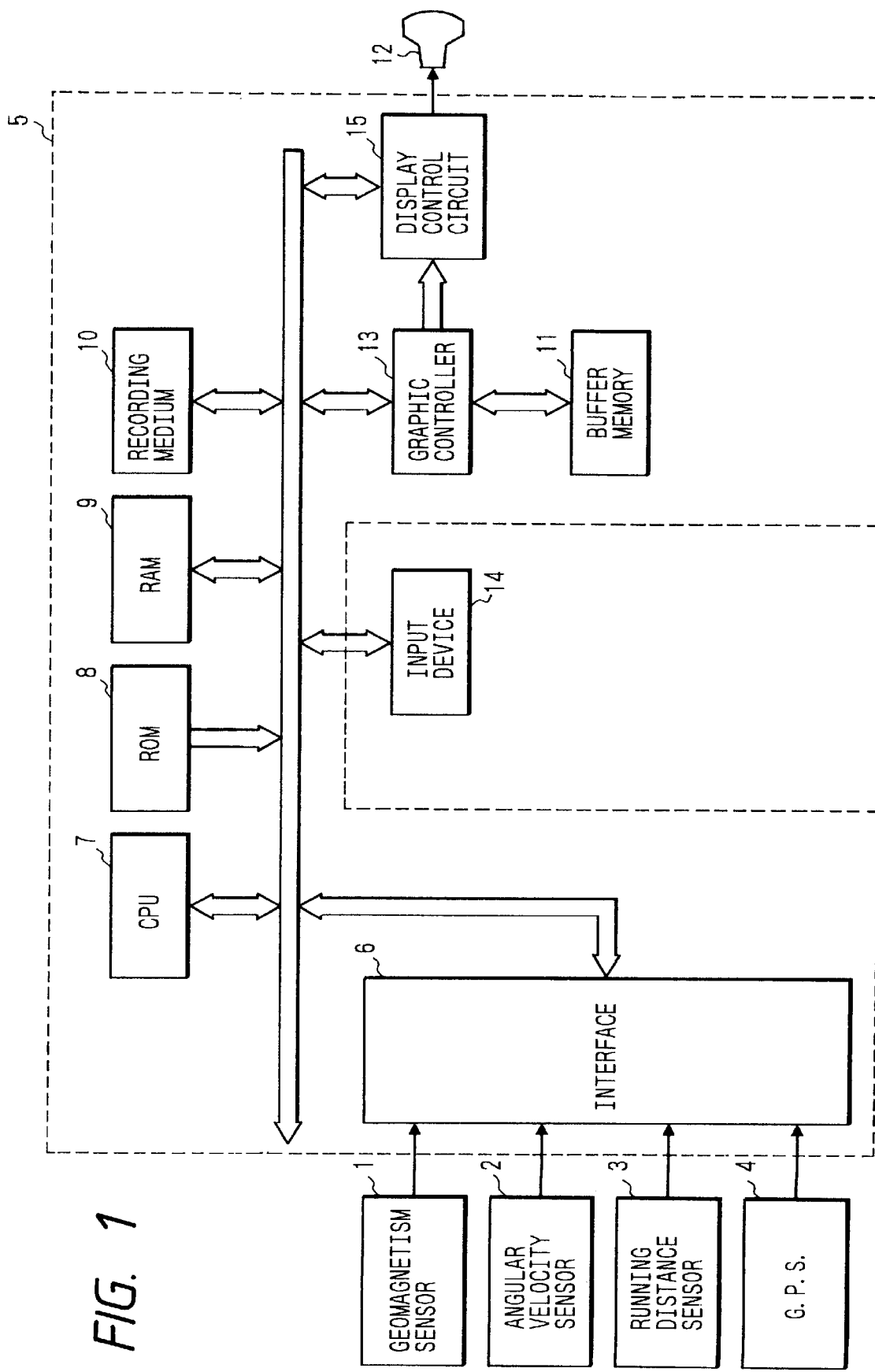
FIG. 1 is a block diagram showing a configuration of a vehicular navigation apparatus to which the present invention is applied.

FIG. 1 is a block diagram showing a configuration of a vehicular navigation apparatus to which the invention is applied. A geomagnetism sensor 1 produces direction data of a vehicle on the basis of geomagnetism. An angular velocity sensor 2 detects an angular velocity of the vehicle. A running distance sensor 3 detects a movement distance of the vehicle. A GPS (global positioning system) device 4 detects a present position etc. of the vehicle on the basis of information such as latitude and longitude. Output signals from these devices (including sensors) are provided to a system controller 5.

The system controller 5 consists of the following components. An interface 6 performs A/D conversion etc. on the output signals of the devices 1–4. A CPU 7 not only performs various kinds of image data processing but also calculates a movement distance etc. of a vehicle based on the output signals of the devices 1–4 which are sequentially provided from the interface 6. Various processing programs for the CPU 7 and other necessary information are stored in a ROM 8 in advance. Information necessary for executing the program is written in and read from a RAM 9. Digitized map information is stored in a recording medium 10 such as a CD-ROM and an IC card. Information of an image to be displayed is temporarily stored in a buffer memory 11 such as a V-RAM (video RAM). A graphic controller 13 causes data of a map etc. from the CPU 7 to be stored into the buffer memory 11, and outputs the data as image information. A display control circuit 15 controls a display 12 such as a liquid crystal display and a CRT in accordance with the image information provided from the graphic controller 13.

An input device 14 such as a keyboard provides the system controller 5 with various instructions generated in accordance with key manipulation by a user.

Figure 2:
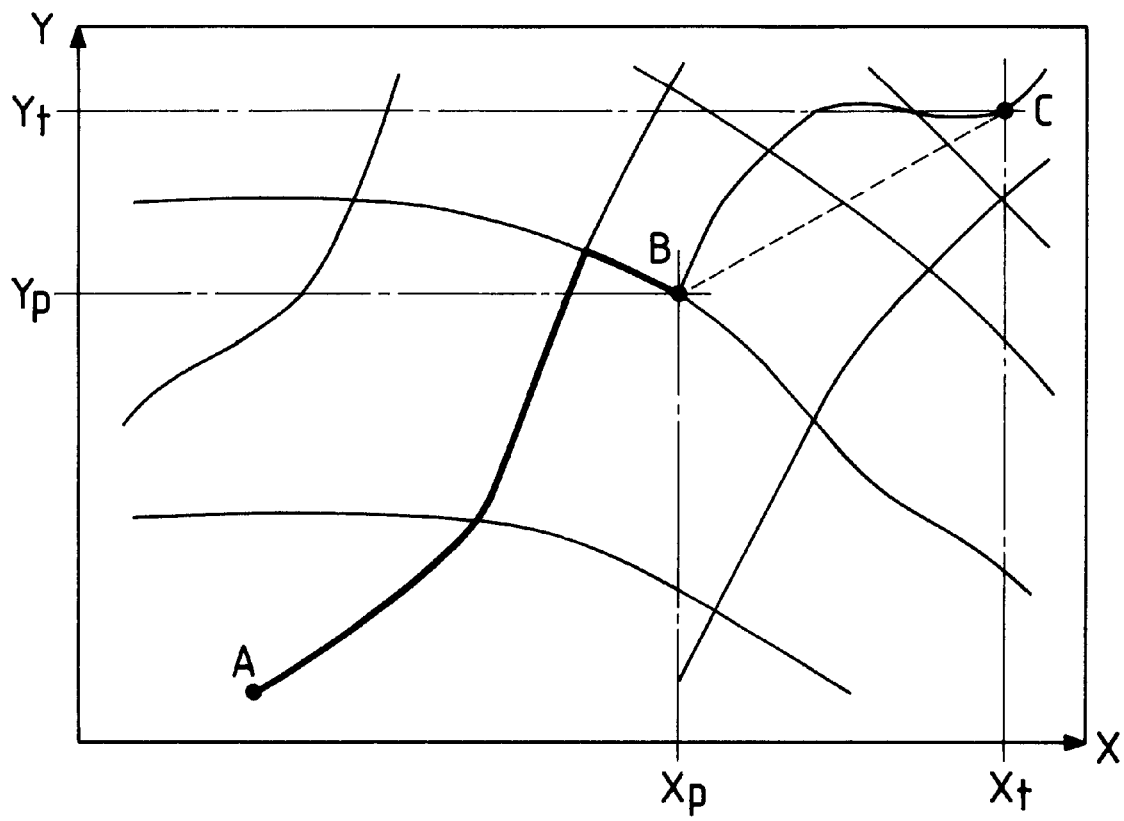
FIG. 2 shows a picture indicating on a map a running status of an own vehicle going from a starting position to a destination.

FIG. 2 shows an example of a displayed picture of a running status of an own vehicle from a starting position toward a destination. Starting position A is a position of the vehicle at a time when destination C was input to the system. Present position B indicates a present position of the own vehicle. Destination C is a destination which was set at a time when the vehicle is located at, e.g., position A. As shown, while a locus, i.e., an actual running route from starting position A to present position B is drawn with a thick solid line, an estimated running distance from position B to destination C with a dashed line. The actual running distance between positions A and B is obtained based on positional information of the own vehicle from the devices (including sensors) 1–4 and positional information of starting position A. On the other hand, the straight-line distance between positions B and C is obtained based on the positional information of the own vehicle and positional information of destination C.

When the own vehicle is presently located at position B in FIG. 2, a degree of attainment T is represented as:

$$T=\{ab/(ab+BC)\}\times100(\%) \quad (1)$$

where ab is an actual running distance from starting position A to present position B, and BC is a straight-line distance from present position B to destination C. The degree of attainment T calculated on equation (1) clearly indicates what distance remains to reach destination C, with respect to the actual running distance ab from starting position A to present position B.

Figure 3:
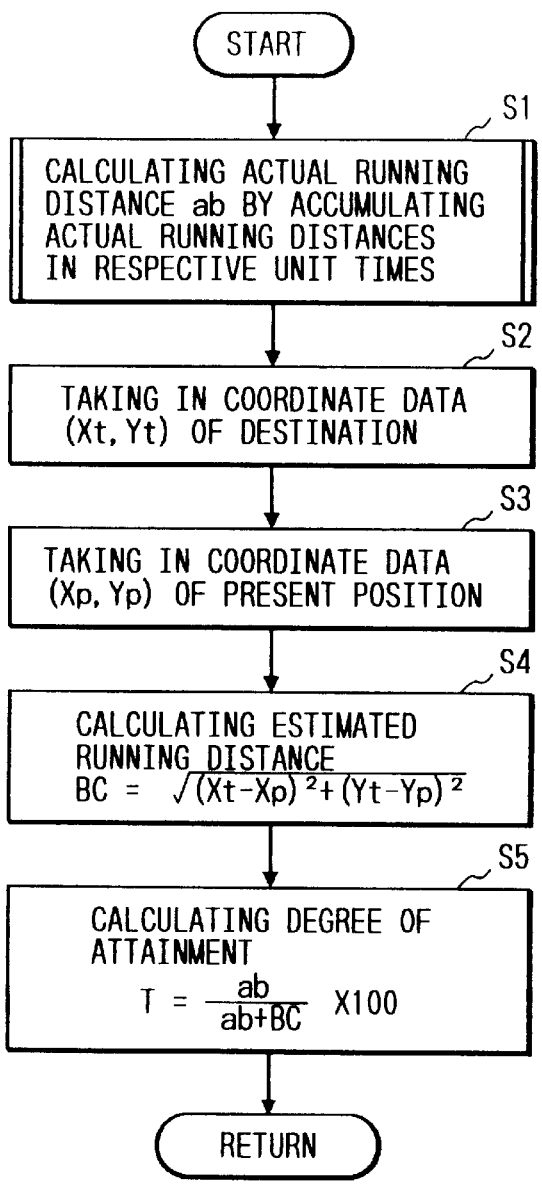
FIG. 3 is a flowchart showing a procedure for calculating a degree of attainment based on distance information.

FIG. 3 is a flowchart showing a procedure for calculating a degree of attainment T using equation (1), which is based on the distance information.

In this routine of calculating a degree of attainment T, in step S1, the CPU 7 first calculates an actual running distance ab from starting position A to present position B by accumulating actual running distances in respective unit time intervals. A result of the accumulation is reset upon inputting new starting position A, which can be effected in the midst of running.

Then, coordinate data (Xt, Yt) of destination C is taken in in step S2, and another coordinate data (Xp, Yp) of present position B in step S3. The coordinate data is based on, for instance, longitude and latitude data as shown in FIG. 2.

Using the coordinate data of destination C and present position B thus taken in, an estimated running distance bc from present position B to destination C is calculated in step S4 as the straight-line distance BC:

$$BC = \sqrt{(Xt - Xp)^2 + (Yt - Yp)^2}. \quad (2)$$

Finally, in step S5, a degree of attainment T is calculated by substituting the above-calculated distance data ab and BC into equation (1).

It is noted that the estimated running distance bc between positions B and C is not limited to a straight-line distance as employed above, but may be any distance which represents an estimated running distance from present position B to destination C.

As an alternative, the actual running distance ab from starting position A to present position B and the estimated running distance bc from present position B and destination C may be replaced by respective counterparts in terms of time. In this case, the degree of attainment T is expressed as:

$$T=[J(ab)/\{J(ab)+J(bc)\}]\times100(\%) \quad (3)$$

where J(ab) is an actual running time from starting position A to present position B, and J(bc) an estimated running time from present position B to destination C. The degree of attainment T calculated on equation (3) clearly indicates how much time will be taken to reach destination C, with respect to the actual running time J(ab) from starting position A to present position B. The estimated running time J(bc) is calculated based on an assumption of:

$$J(bc)=bc/Vbc \quad (4)$$

where Vbc is an estimated average running speed for an own vehicle to cover the estimated running distance bc from present position B to destination C.

Figure 4:
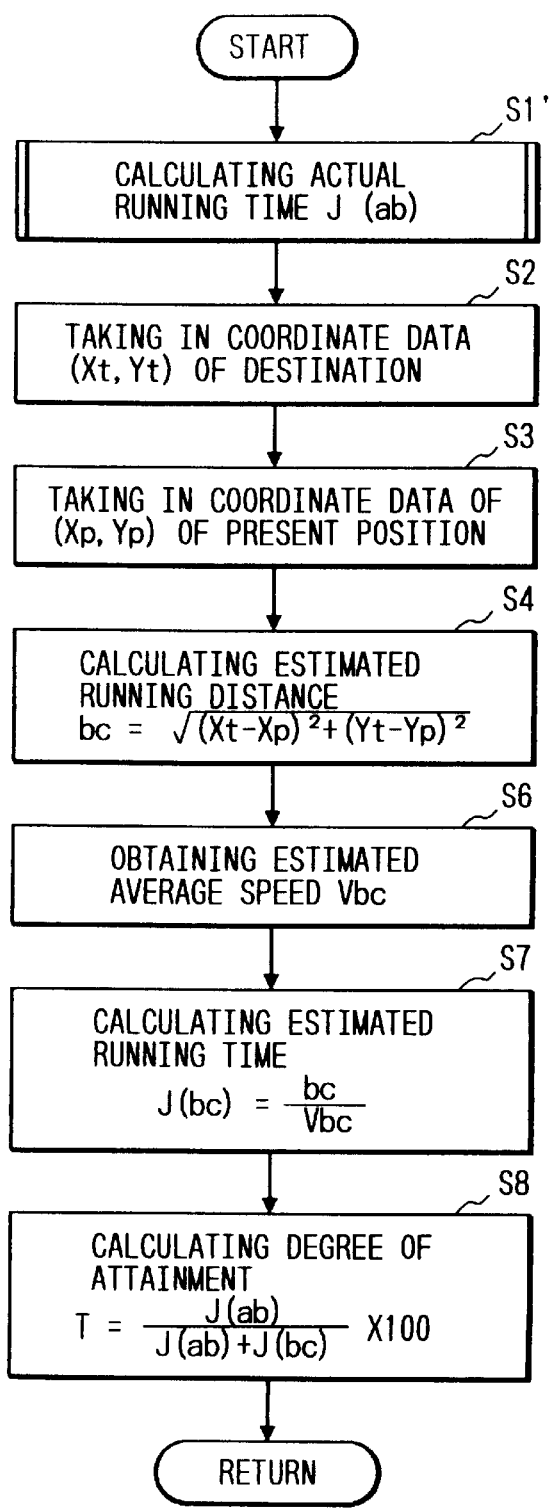
FIG. 4 is a flowchart showing a procedure for calculating a degree of attainment based on temporal information.

FIG. 4 is a flowchart showing a procedure for calculating a degree of attainment T using equation (3), which is based on the temporal information.

In step S1', an actual running time J(ab), i.e., a time elapsed while a vehicle moves from arbitrarily set starting position A to present position B, is first calculated. Since steps S2–S4 are identical to those in FIG. 3, a description for those is omitted here. An estimated running distance bc in step S4 is a straight-line distance between positions B and C. After completion of step S4, the CPU 7 takes in a value of an estimated average speed Vbc as set and input by a user using the input device 14, or calculates an average running speed from starting position A to present position B based on another processing routine (not shown) and employs the calculated value as the estimated average running speed Vbc.

Then, the CPU 7 calculates an estimated running time J(bc) in step S7 by substituting the above-obtained estimated running distance bc and the estimated average running speed Vbc into equation (4). Finally, in step S8, the degree of attainment T is calculated by substituting the above-calculated time data J(ab) and J(bc) into equation (3).

The methods of FIGS. 3 and 4 have an advantage that even if the own vehicle goes back toward starting point A on the way from position B to destination C, the calculated degree of attainment takes a value in consistence with a driver's feeling, because the calculation is based on the actual covered distance or elapsed time from starting point A.

Next, a description is made of an embodiment of a method of announcing the degree of attainment thus obtained.

Figure 5:
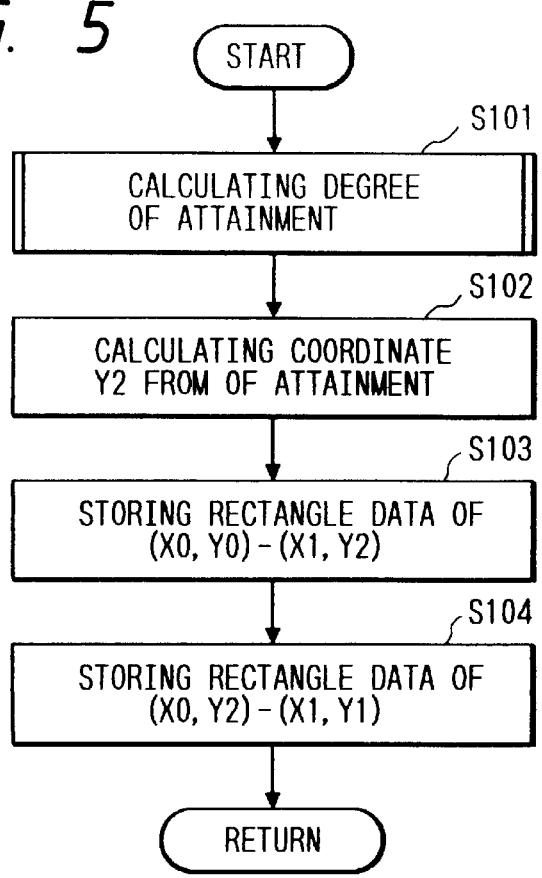
FIG. 5 is a flowchart showing a procedure for displaying the degree of attainment.

FIG. 5 is a flowchart showing a procedure performed by the CPU 7 to indicate the degree of attainment on the display 12. In this embodiment, as shown in FIG. 6, the degree of attainment is indicated, in addition to a map, on the display screen in the form of a bar graph in which the portion (hatched in the figure) corresponding to the attainment is colored.

Upon entering a routine for displaying the degree of attainment in a main routine (not shown), the CPU 7 first executes in step S101 the routine for calculating the degree of attainment as shown in FIGS. 3 or 4.

Figure 6:
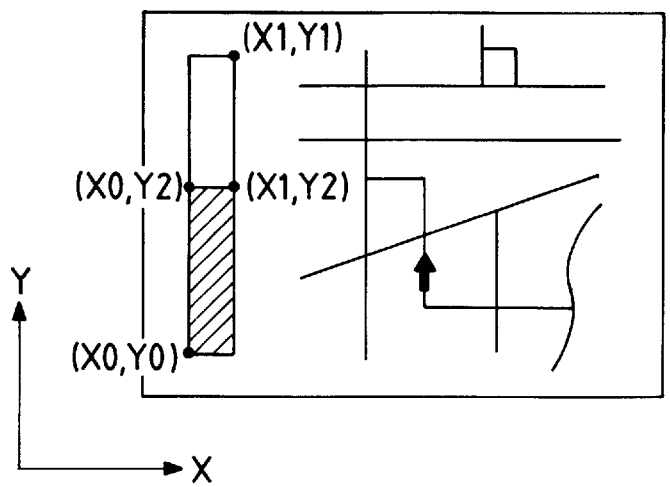
FIG. 6 shows a picture in which the degree of attainment is indicated in the form of a bar graph, and which is used in explaining the procedure of FIG. 5.

Then, as shown in FIG. 6, the CPU 7 calculates in step S102 coordinates (X1, Y2) of the bar on the display screen with coordinates (X0, Y0) of the origin as a reference point, in which the difference between coordinate Y2 and coordinate Y0 of the origin is proportional to the degree of attainment calculated above. The difference between coordinate X1 and coordinate X0 of the origin means a width of the bar, and may be determined in accordance with information to be displayed.

In step S103, data of a rectangle having the origin (X0, Y0) and the point (X1, Y2) as its diagonal apexes is stored into the buffer memory 11 as data indicating the degree of attainment. The data includes information necessary for filling in the inside of the rectangle, i.e., the hatched portion, with a color specified in advance.

In step S104, data of another rectangle having the points (X0, Y2) and (X1, Y1) as its diagonal apexes is stored into the buffer memory 11 as data that indicates an amount remaining to reach the 100% degree of attainment. (Coordinate Y1 corresponds to the 100% degree of attainment.) Thereafter, the process returns to the main routine.

Based on the data stored in the buffer memory 11, the CPU 7 and graphic controller 13 perform display control in the main routine (not shown) to display the degree of attainment.

Figure 7:
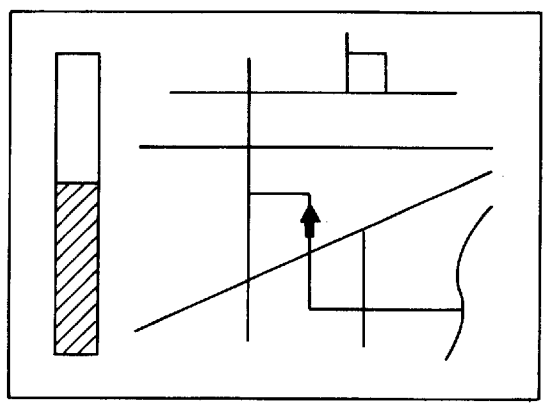
FIG. 7 shows a picture in which the degree of attainment is indicated.
Figure 8:
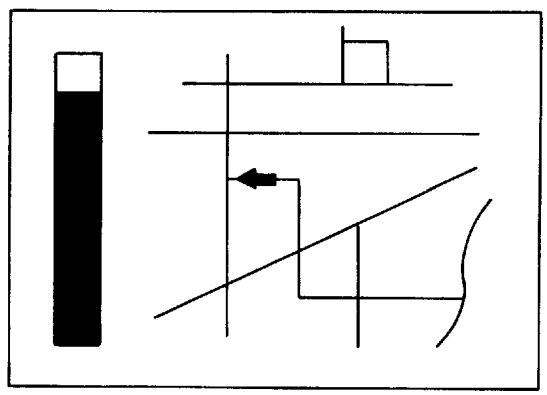
FIG. 8 shows another picture in which the degree of attainment is indicated.

The above embodiment can easily be modified such that, to announce that the own vehicle is approaching the destination, when the degree of attainment exceeds a predetermined level the color or brightness of the attainment-indicating portion of the bar is changed as shown in FIG. 8 from that of the hatched portion of FIG. 7 in the case of a lower degree of attainment. Further, the degree of attainment may be displayed in the form of a circular graph, or may be announced by an appropriate sound.

Figure 9:
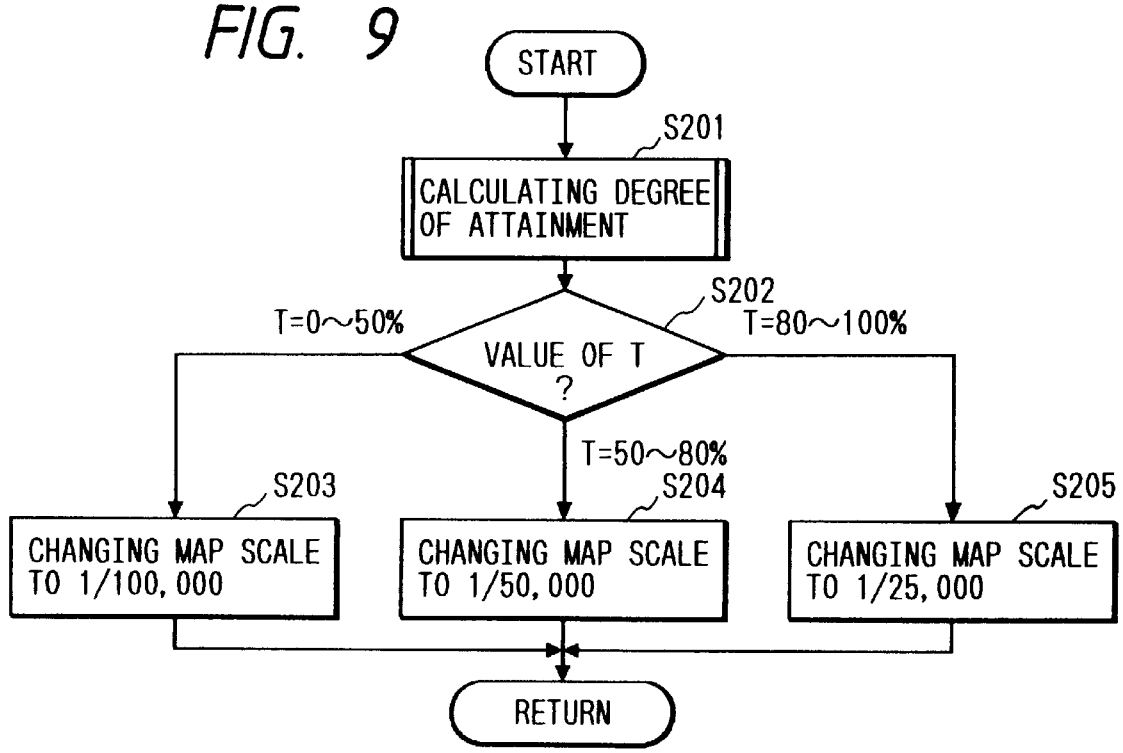
FIG. 9 is a flowchart showing a procedure for changing a map scale in accordance with the degree of attainment.

Further, instead of simply announcing the degree of attainment, the scale of a map to be displayed may be changed in accordance with the value of the degree of attainment. FIG. 9 is a flowchart showing a procedure for performing such a process.

As shown in FIG. 9, the CPU 7 first calculates a degree of attainment T in step S201, and then evaluates it in step S202. If it is judged that the degree of attainment T is within the range of 0–50%, i.e., an own vehicle is not close to the destination, a map to be displayed is stored into the buffer memory 11 in step S203 with its scale changed to 1/100,000. If the degree of attainment T is judged to be within the range of 50–80%, i.e., the vehicle have passed the middle point of a route from the starting position to the destination, a map to be displayed is stored into the buffer memory 11 in step S204 with its scale changed to 1/50,000. If the degree of attainment T is judged to be within the range of 80–100%, i.e., the vehicle is very close to the destination, a map to be displayed is stored into the buffer memory 11 in step S205 with its scale changed to 1/25,000.

That is, the displayed map is enlarged to provide more detailed road information as the vehicle approaches the destination. Therefore, the user can properly select a route.

As described in the foregoing, according to the invention, the degree of attainment is calculated on the basis of an actual running distance or time, and then announced. Therefore, a measure indicating to what degree an own vehicle has approached a destination can be calculated easily, and a driver can recognize the degree of attainment as a value properly representing his actual feeling.

What is claimed is:

1. A navigation apparatus in a vehicle comprising:

a system controller including a CPU, a memory, a recording medium for storing digitized map information, an interface, a graphics controller, a display control circuit and a data bus connecting said CPU, memory, recording medium, interface, graphics controller and the display control circuit to one another;

a running distance sensor for detecting a movement distance of the vehicle and outputting movement distance data to the interface;

a global positioning system for detecting a present position of the vehicle and outputting present position data to the interface;

a display connected to the display control circuit for displaying a map relating the present position of the vehicle;

an input device for receiving start position data representing a start position and destination position data representing a destination position and outputting the start position data and the destination position data to the data bus of the system controller;

wherein the CPU determines an actual running distance ab from the start position to the present position based upon the start position data from the input device and the movement distance data from the running distance sensor, determines an estimated running distance bc from a detected present position to the destination position based upon detected present position data from the global positioning system and the destination position data received from the input device, calculates a degree of attainment T according to an equation of: T=ab/(ab+bc) and outputs the degree of attainment T to the display control circuit; and the display control circuit causes the display to display the degree of attainment T.

2. The apparatus of claim 1, wherein the CPU determines the estimated running distance bc as a straight-line distance between the detected present position and the destination position.

3. The apparatus of claim 1, wherein a scale of the map on the display changes in accordance with the degree of attainment T.

4. A navigation apparatus in a vehicle comprising:

a system controller including a CPU, a memory, a recording medium for storing digitized map information, an interface, a graphics controller, a display control circuit and a data bus connecting said CPU, memory, recording medium, interface, graphics controller and the display control circuit to one another;

a timer connected to the data bus for outputting measured time data representing an amount of time between a first event and a second event;

a running distance sensor for detecting a movement distance of the vehicle and outputting movement distance data to the interface;

a global positioning system for detecting a present position of the vehicle and outputting present position data to the interface;

a display connected to the display control circuit for displaying a map relating the present position of the vehicle;

an input device for receiving start position data representing a start position and destination position data representing a destination position and outputting the start position data and the destination position data to the data bus of the system controller;

wherein the CPU determines an actual running time J(ab) from the start position to the present position based upon the output from the timer, determines an actual running distance ab from the start position to the present position based upon the start position data from the input device and the movement distance data from the running distance sensor, determines an estimated running distance bc from a detected present position to the destination position based upon detected present position data from the global positioning system and the destination position data received from the input device, calculates an estimated average speed Vbc from the start position to the detected present position, calculates an estimated running time J(bc) from the detected present position to the destination position according to the equation: J(bc)=bc/Vbc, calculates a degree of attainment T according to the equation: T=J(ab)/(J(ab)+J(bc)) and outputs the degree of attainment T to the display control circuit; and the display control circuit causes the display to display the degree of attainment T.

5. The apparatus of claim 4, wherein the CPU determines an actual average speed Vab based upon the actual running distance ab and the actual running time J(ab) and employs the actual average speed Vab as the estimated average speed Vbc.

6. The apparatus of claim 4, wherein a scale of the map on the display changes in accordance with the degree of attainment T.

7. A navigation apparatus in a vehicle comprising:

a system controller including a CPU, a memory, a recording medium for storing digitized map information, an interface, a graphics controller, a display control circuit and a data bus connecting said CPU, memory, recording medium, interface, graphics controller and the display control circuit to one another;

a timer connected to the data bus for outputting measured time data representing an amount of time between a first event and a second event;

a running distance sensor for detecting a movement distance of the vehicle and outputting movement distance data to the interface;

a global positioning system for detecting a present position of the vehicle and outputting present position data to the interface;

a display connected to the display control circuit for displaying a map relating the present position of the vehicle;

an input device for receiving start position data representing a start position and destination position data representing a destination position and outputting the start position data and the destination position data to the data bus of the system controller;

wherein the CPU determines an actual running time J(ab) from the start position to the present position based upon the output from the timer, determines an actual running distance ab from the start position to the present position based upon the start position data from the input device and the movement distance data from the running distance sensor, determines an estimated running distance bc from a detected present position to the destination position based upon detected present position data from the global positioning system and the destination position data received from the input device, calculates an estimated running time J(bc) from the detected present position to the destination position according to the equation: J(bc)=bc/Vbc, where Vbc is an estimated average speed from the detected present position to the destination position, said estimated average speed Vbc set and input by a user through the input device, calculates a degree of attainment T according to the equation: T=J(ab)/(J(ab)+J(bc)) and outputs the degree of attainment T to the display control circuit; and the display control circuit causes the display to display the degree of attainment T.

* * * * *